United States Patent [19]
Mann

[11] Patent Number: 5,251,922
[45] Date of Patent: Oct. 12, 1993

[54] HAND TRUCK

[76] Inventor: Larry D. Mann, 805 Walnut, Rock Springs, Wyo. 82901

[21] Appl. No.: 933,726

[22] Filed: Aug. 24, 1992

[51] Int. Cl.⁵ .............................................. B62B 1/12
[52] U.S. Cl. .................. 280/47.29; 187/9 R; 414/490
[58] Field of Search ............... 414/490, 673; 187/1 A, 187/94, 9 R; 280/47.29, 47.27, 47.28, 47.24

[56] References Cited

U.S. PATENT DOCUMENTS

| | | | |
|---|---|---|---|
| 380,603 | 4/1888 | Steele | 280/47.29 X |
| 1,725,402 | 8/1929 | Lindquist | 187/1 A |
| 2,148,123 | 2/1939 | Hymans | 187/1 A |
| 2,598,489 | 5/1952 | Bayer et al. | 280/47.33 X |
| 3,052,323 | 9/1962 | Hopfeld | 280/47.29 X |
| 3,578,353 | 5/1971 | Lockhart | 280/47.29 X |
| 3,704,799 | 12/1972 | Morris, Jr. | 280/47.29 X |
| 3,907,138 | 9/1975 | Rhodes | 280/47.29 X |
| 4,356,892 | 11/1982 | Mossey | 187/9 R |
| 4,632,627 | 12/1986 | Swallows | 414/490 |
| 4,737,065 | 4/1988 | Ju | 414/490 |

Primary Examiner—Margaret A. Focarino
Assistant Examiner—Michael Mar
Attorney, Agent, or Firm—Terry M. Crellin

[57] ABSTRACT

A hand truck which includes an automatically adjustable toe plate. The toe plate is attached to the frame of the hand truck in a slidable manner by means of a coil spring. A load placed on the toe plate causes it to move downwardly a predetermined distance. The coil spring may be sized for a particular use depending on the bulk and weight of objects placed thereon such that a predetermined object placed on the toe plate will cause its movement downwardly a predetermined distance in order that the top of any object or stack of objects located on the hand truck is at a level above the ground which is convenient for an operator thereof to load and unload the hand truck without the necessity of bending in order to place objects onto or remove them from the hand truck.

4 Claims, 2 Drawing Sheets

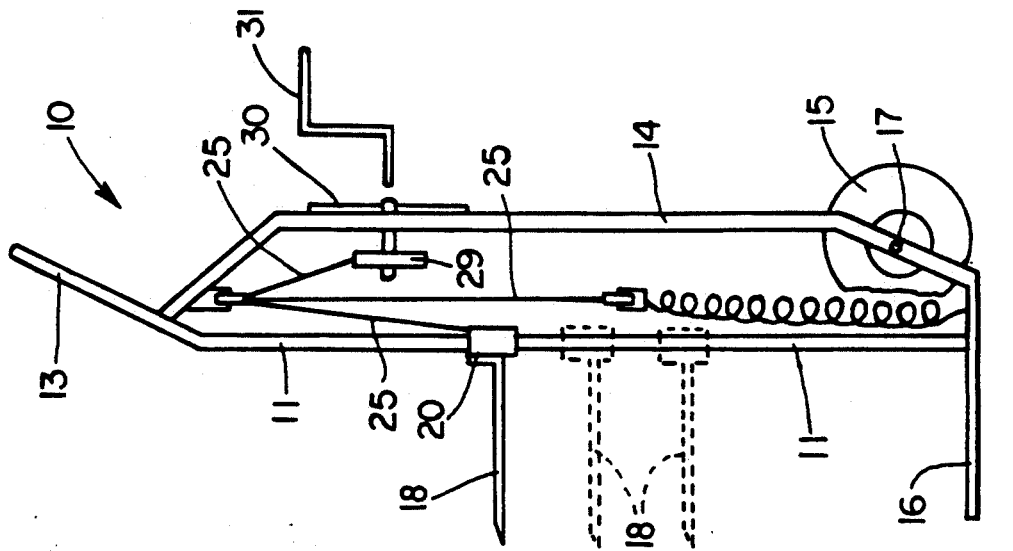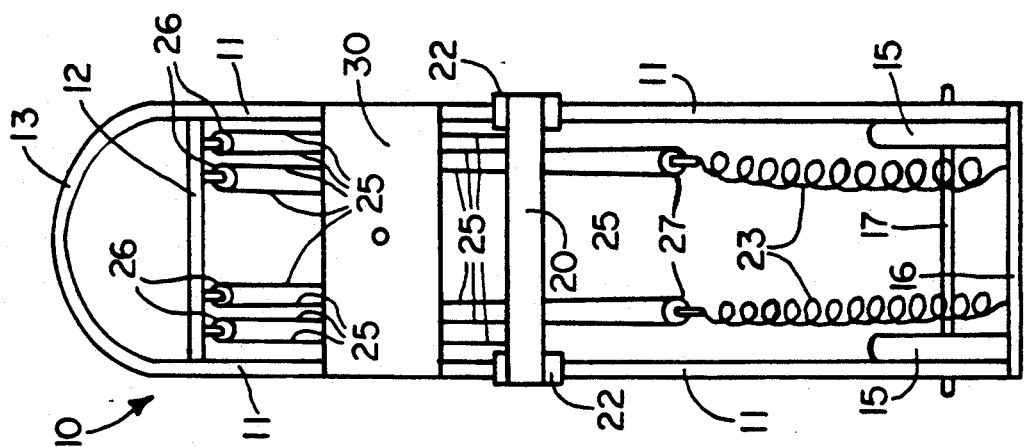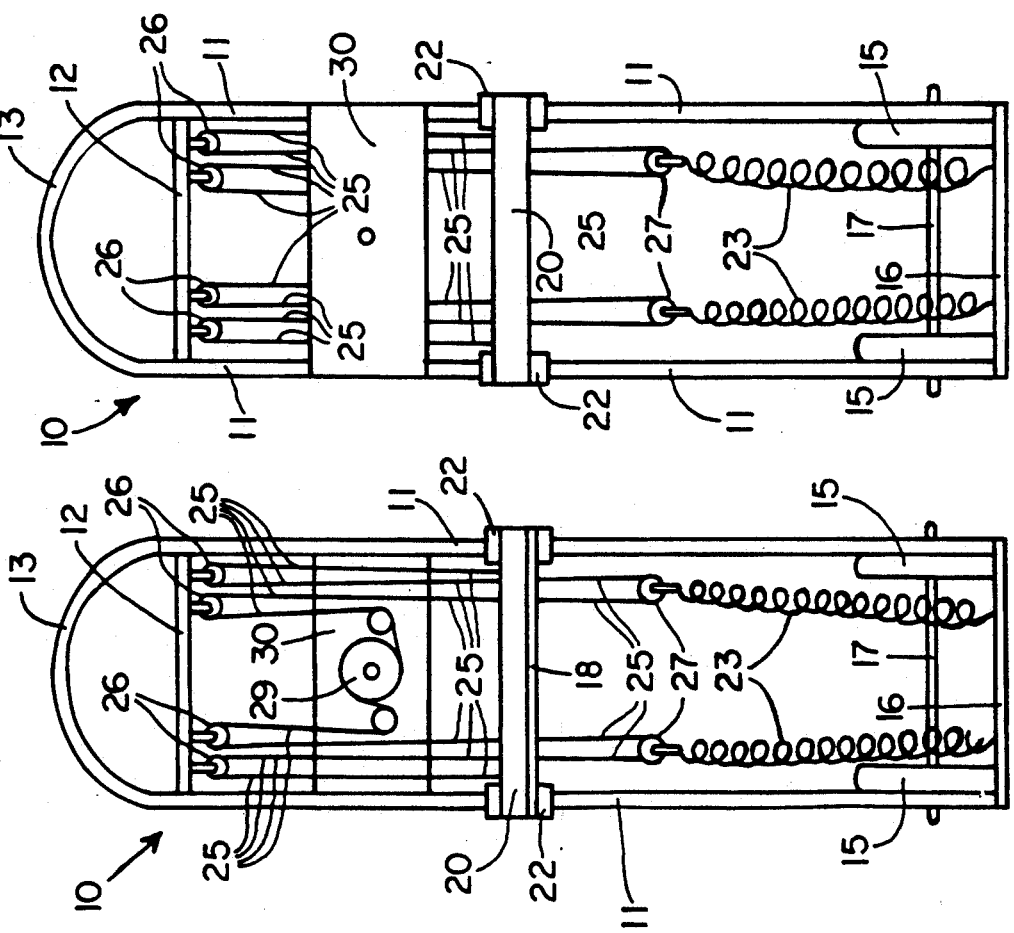

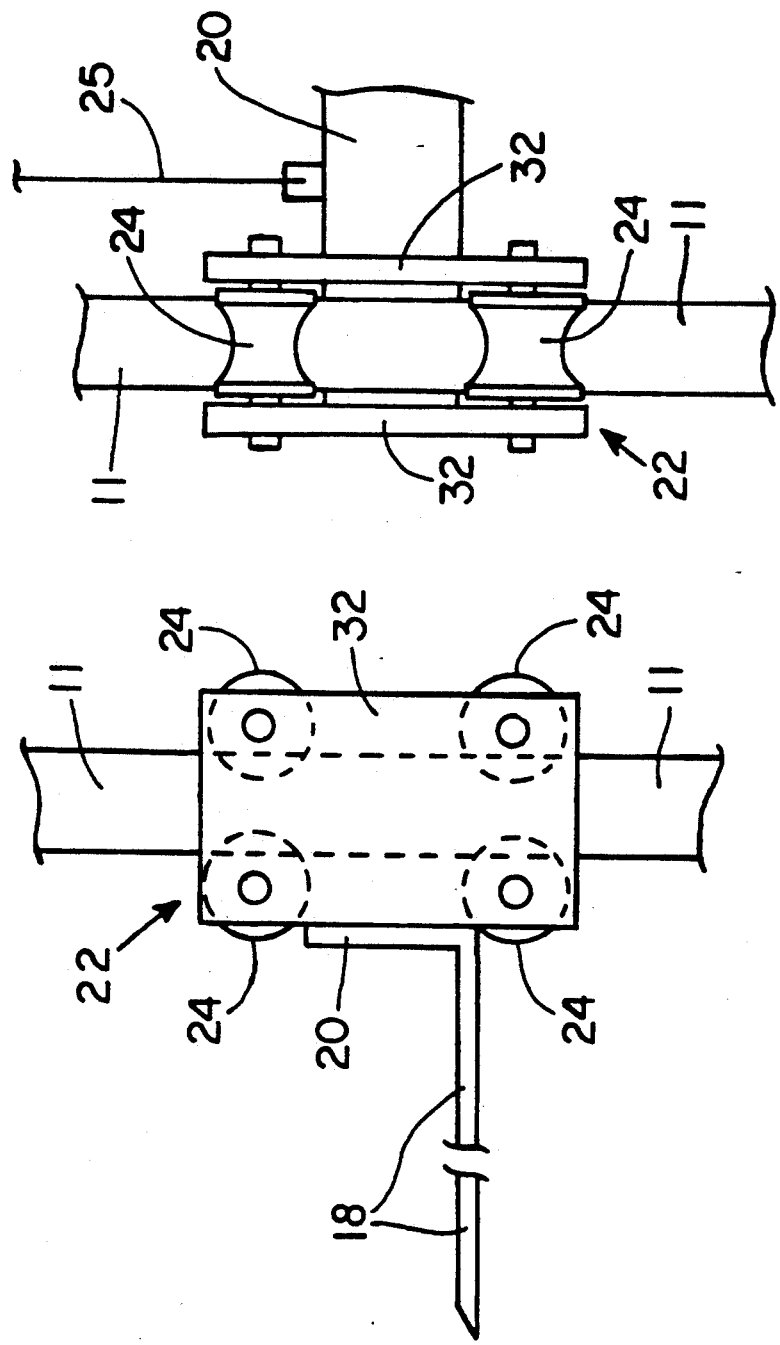

HAND TRUCK

BACKGROUND OF THE INVENTION

1) Field of the Invention

This invention relates generally to material handling equipment. More particularly, the present invention relates to a hand truck which allows for loading and unloading of objects thereon such as cases of beverage cans, in a manner which substantially eliminates any necessity for the operator to bend over in order to place an object onto the hand truck or to remove an object therefrom.

2) Related Prior Art

Hand trucks for transporting objects have been in use for many years. Such hand trucks are generally comprised of a toe plate which is fixed in a perpendicular orientation to a support frame, with a set of wheels located in approximately at the connection point. The toe plate is loaded with objects, either by placing objects directly thereon or by sliding the toe plate underneath the object. The support frame is then grasped by the operator and the wheels are temporarily immobilized while the operator rotates the support frame to lift the toe plate, and the objects placed thereon, until only the wheels remain on the ground. The hand truck can then be rolled by the operator to transport the objects thereon to a desired location. When it is desired to unload the hand truck the wheels are again immobilized and the toe plate is again rotated until it rests on the ground. The operator then may remove objects from the hand truck or may remove the hand truck by removing the toe plate from beneath the objects.

It has often been desirable for certain types of lifting requirements to modify the standard hand truck to make it more useful to the operator during loading and unloading thereof. Such modifications usually include a toe plate which is movable along the support frame in such a manner that the toe plate may be adjusted to a convenient position for either loading or unloading of objects thereon. A hand truck exemplary of this design is shown in U.S. Pat. No. 3,052,323 to Hopfeld which shows a hand truck having a movable toe plate which is adjustable along the frame by means of a chain and hydraulic pump. Other hand trucks exemplary of this concept are U.S. Pat. No. 3,907,138 Rhodes, U.S. Pat. No. 3,704,799 Morris, Jr. and U.S. Pat. No. 2,598,489 Bayer et al., which show hand trucks which have been modified to allow the toe plate to adjust along the frame thereof by means of a threaded screw.

In each of the prior art devices, the toe plate must be positioned by the operator through the operators actuation of the mechanism which moves the toe plate. This can become very inconvenient when the operator must load and unload a very large number of objects. Since the operator must readjust the location of the toe plate each time an object is loaded or unloaded from the hand truck, a very large amount of time can be expended in operating a hand truck when a very large number of objects must be loaded and unloaded. An example of this inconvenience can be illustrated in the situation where a delivery person delivering objects such as cases of beverage cans or other goods, must quickly load a hand truck with several cases and move them a very short distance into a store and then quickly unload them again. In this instance, a requirement for the operator to readjust the toe plate location in between loading and/or unloading of each individual case, can easily triple or quadruple the time factor involved in moving the cases into the store.

There is therefore a need to develop a hand truck which has a moveable toe plate which can automatically move to its proper position on the frame, dependent upon the load placed thereon or removed therefrom.

Also, an operator in the example described above must often bend over many times to load cases of cans onto a hand truck, and then bend over again several times when unloading the cases. Such bending and lifting, especially when done successively hundreds of times each working day, can have serious effect on the operators health. Muscle strain, back injuries, etc. are very common for operators of this type. Such injuries may be minimized or eliminated by a hand truck having a toe plate which can be adjusted to a proper height above the ground so as to alleviate any need for an operator to bend over to load or unload objects therefrom. Such a device must also be capable of adjusting the location of the toe plate in accordance with the load located thereon, in order that the load itself is properly positioned at a height which allows further loading or unloading without the need for the operator to bend while lifting.

OBJECTS AND SUMMARY OF THE INVENTION

An object of the present invention is to provide a hand truck having a moveable toe plate which is automatically adjusted by the weight of objects placed thereon such that the necessity for an operator bending over while loading or unloading the hand truck is eliminated.

It is another object of the present invention to provide a hand truck as described above which includes a spring attached between the frame and the moveable toe plate of the hand truck in such a manner that an object placed on the toe plate pulls against the spring and causes the toe plate to readjust on the support frame.

It is another object of the present invention to provide a hand truck as described above in which the torsion spring is specifically designed to allow movement of the toe plate in response to objects placed thereon or removed therefrom in such a manner that the top of any stack of objects on the hand truck is also positioned at a height which alleviates the necessity of an operator from bending in order to load further objects onto the stack or remove objects therefrom.

These and other objects of the present invention are realized in a preferred embodiment thereof which includes a hand truck having a support frame which includes a set of wheels located at one end thereof. The support frame includes a pair of rail members to which a toe plate is slidably attached. The frame also includes a spring which is functionally attached by means of a cable or like to the toe plate.

In use, the toe plate is located approximately at the waist level of an operator when there are no objects located thereon. As an operator loads an object, such as a case of beverage cans or other goods onto the toe plate, the spring, under tension due to the load and the toe plate, moves downwardly a distance corresponding to the weight of the case. The spring is sized so that the movement of the toe plate caused by the weight of the case is equivalent to the height of the case so that once the case is placed on the toe plate, the toe plate moves downwardly until the top of the case is approximately at the original position of the toe plate. A second case may then be placed on the top of the first case by the operator which then causes the toe plate to again move downwardly a distance equivalent to the height of one case. The operator can continue to load the hand truck, always placing the next case in the same position thereon as the last case, therefore never being required to bend over while loading the hand truck. When it is desired to unload the hand truck, the removal of a case of goods causes the spring to move the toe plate upwardly a distance equivalent to the height of one case. Therefore, each time the operator removes a case of goods from the hand truck the next case rises to the position of the previous case. The operator thus is relieved of bending in order to remove cases from the hand truck.

Since the toe plate of the present invention automatically adjusts to its proper position in response to a load placed thereon, the operator is relieved from the time consuming task of readjusting the toe plate in between a loading or unloading of each object. Obviously, depending on the objects to be loaded on the hand truck, the torsion spring may be sized to cause the proper movement of the toe plate in response to the loading and unloading of the objects.

BRIEF DESCRIPTION OF THE DRAWINGS

FIG. 1 shows a front view of the hand truck made in accordance with the principles of the present invention;

FIG. 2 shows a back view of the hand truck of FIG. 1;

FIG. 3 shows a side view of the hand truck of FIG. 1;

FIG. 4 is a side view taken along line 4—4 of FIG. 1 showing the roller bearing member that allows the toe plate of the hand truck to slide up and down along the side rails;

FIG. 5 is a back elevation view of the roller bearing member of FIG. 4 taken along line 5—5 of FIG. 4.

DETAILED DESCRIPTION OF THE INVENTION

As illustrated in the drawings, the hand truck 10 of the present invention is formed generally of a frame assembly having a pair of side rails 11 extending upwardly from the lateral sides of a fixed toe plate 16. An adjustable toe plate 18 is mounted on the side rails 11 for sliding movement therealong over the central and bottom portions thereof. A spring assembly is positioned along the back side of the frame assembly. As illustrated, the spring assembly comprises two elongate coil springs 23 having their lower ends affixed to the fixed toe plate 16. The upper ends of the springs 23 are connected through a pair of cables 25 to the adjustable toe plate 18. The adjustable toe plate 18 can slide along the entire central and lower portions of the side rails 11 to any point between the fixed toe plate 16 and the upper end of the frame assembly.

The frame assembly further includes an upper brace member 12 extending between the side rails 11 and a pair of back rails 14 held in parallel spaced apart relationship to each other by the fixed top plate 16. The back rails 14 extend upwardly substantially parallel with the side rails 11 and spaced backwardly from the side rails 11. The top ends of the back rails 14 bend forward and join the side rails 11 at the upper brace member 12 which is positioned near the tip end of the frame assembly. The back rails 14 provide attachment locations for the axle 17 which holds the wheels 15 of the hand truck 10 to the sides of the frame assembly. It is to be understood that although wheels 15 and axles 176 are shown as the means for allowing mobility of the hand truck 10, it should be well understood that any means for allowing mobility of the hand truck, as commonly known in the prior art, may be used in conjunction with the present invention.

Fixed toe plate 16 is formed of a flat generally rectangularly shaped piece of material such as metal, and is attached directly to the bottom portion of frame assembly. Fixed toe plate 16 can be welded or otherwise securely attached to the lower ends of the side rails 11 and the back rails 14 so as to extend forwardly from the frame assembly in a direction generally perpendicular to the side rails 11.

The top portion of the frame assembly includes an arcuate handle 13 which aids in supporting rails 11 and 14 in their spaced apart parallel relationship and also as a handle to be used by an operator for purposes of handling and/or manipulating the hand truck 10 during use in such a manner as will be described below.

The adjustable toe plate 18 is attached in sliding relationship to rails 11 by roller attachment members 22. Each attachment member 22, as best shown in FIGS. 4 and 5, is formed with two side plates 32 positioned in parallel arrangement on opposite lateral sides of the side rails 11. Two pair of roller members 24 are positioned between the plates 32 and each roller member 24 has an indented rolling surface of a size and shape so as to freely roll over the surface of the side rail 11. The two pair of roller members 24 are vertically spaced from each other by several inches so as to provide stability to the toe plate 18 and allow the toe plate 18 to move up and down the side rails 11 without binding.

A base plate 20 is securely attached across the forward side of each of the attachment members 22 and welded or otherwise securely fixed thereto. The base plate 20 preferably also extends across the width of the frame assembly of the hand truck 10 from one attachment member 22 to the other attachment member 22.

The adjustable toe plate 18 is attached as by welding to the base plate 20 so that the toe plate 18 forms a substantially right angle with the base plate 20 and the side rails 11. A pair of cables 25 are attached to the base plate 20 and extend upwardly therefrom along the back side of the hand truck 10. The cables 25 extend around a pair of pulleys 26 which are attached to the upper brace member 12 at the upper end of the hand truck 10. The pair of cables 25 then extend downwardly to two elongate coil springs 23. The lower ends of the coil springs 23 are attached to the fixed toe plate 16 and the upper ends of the coil springs 23 engage the pair of cables 25.

In the preferred embodiment shown in the drawings, a second pair of pulleys 27 are attached to the upper ends of the coils springs 23, and the cables 25 pass around the pulleys 27 and extend upwardly to a third set of pulleys 26 which are attached to the upper brace member 12 near the first set of pulleys 26. The cables 25 pass around the third set of pulleys 26 to a take up reel 29 that is mounted on a support plate 30 attached to the back rails 14 of the hand truck 10.

A removable crank 31 can be provided for rotating the take up reel 29 to wind the cables 25 on the take up reel 29. By winding various amounts of the cables 25 on the take up reel 29, the amount of spring force applied to the toe plate 18 through the cables 25 can be adjusted. This allows adjustment of the amount of movement that the toe plate 18 experiences as a weight, such as a case of beverage cans, is loaded on the toe plate 18. The combination of elongate coil springs, compound pulley system and the take up reel shown in the drawings has been found to provide an ideal adjustment mechanism for the movement of the toe plate 18.

An important aspect of the present invention is the automatic adjustment of the adjustable toe plate 18 to a position along the rails 11 of the frame assembly in response to an object being loaded onto or unloaded from the adjustable toe plate 18. As best shown in FIG. 3, adjustable toe plate 18 moves downwardly along rails 11 as objects are loaded thereon. The springs 23 automatically adjusts the position of adjustable toe plate 18 as objects are placed thereon so that each object, or stack of objects, are properly positioned on the hand truck 10 for simplicity in loading and unloading thereof. In other words, the adjustable toe plate 18 is allowed to move along rails 11 in response to objects being loaded onto or unloaded from the adjustable toe plate 18 so that the last object (or the top of the stack of objects) is always positioned a proper distance above the ground so that an operator can load another object onto the hand truck 10 or remove an object therefrom without the necessity of bending over to do so.

The springs 23 and connecting cables 25 allow the toe plate 18 to extend or retract a proper distance in response to the weight of the load being placed on or removed from it. It should be recognized, however, that the hand truck of the present invention can be used as a conventional hand truck by removing the tension from the springs 23 and cables 25, such as by unwinding the crank 31, thereby allowing the toe plate 18 to move to the lower end of the frame of the hand truck.

It is to be understood that the above described embodiment of the present invention is only illustrative of the application of the principles thereof. Numerous modifications and alternative embodiments or arrangements may be devised by those skilled in the art without departing from the spirit and scope of the present invention and the appended claims are intended to cover such modifications and arrangements.

I claim:

1. A hand truck comprising:
   frame means having a top portion, a bottom portion, a central portion and opposite lateral sides bounding said central portion;
   means for mobilizing said hand truck, said mobilizing means being functionally attached to said frame means at the bottom portion of said frame means;
   lifting means movably attached to said frame means;
   a first pulley and a third pulley located near the top portion of said frame means;
   an elongate coil spring attached between said frame means and said lifting means for automatically adjusting the position of said lifting means on said frame means in response to a load placed on said lifting means;
   said spring having a first end and a second end, said first end being attached to said bottom portion of said frame means, and said second end being attached to second pulley;
   a cable, said cable having a one end attached to said lifting means, said cable extending upwardly from said lifting means, around said first pulley and downwardly to said second pulley, around said second pulley and upwardly to said third pulley, around said third pulley and downwardly to a take up reel which can be rotated to wind said cable on said reel.

2. A hand truck according to claim 1 wherein said frame means includes a pair of spaced apart side rails located on each of the opposite lateral sides of said frame means, with said lifting means being coupled to said side rails for sliding movement along said side rails.

3. A hand truck according to claim 2 wherein said lifting means includes a plate which is slidably attached to and in perpendicular orientation with said frame means.

4. A hand truck according to claim 1 wherein said frame means includes a pair of rails located in parallel spaced apart relationship, and said lifting means includes a plate oriented perpendicularly to said pair of rails and means for slidably attaching said plate to said pair of rails.

* * * * *